United States Patent [19]

Cacciatore et al.

[11] Patent Number: 6,053,637
[45] Date of Patent: Apr. 25, 2000

[54] GOODS WAGON AXLE BEARING ASSEMBLY

[75] Inventors: Rolando Cacciatore, Nichelino; Matteo Genero, Santena; Roberto Moretti, Cambiano, all of Italy

[73] Assignee: SKF Industrie S.P.A., Turin, Italy

[21] Appl. No.: 08/907,190

[22] Filed: Aug. 6, 1997

[30] Foreign Application Priority Data

Sep. 13, 1996 [IT] Italy .................................. TO9600752

[51] Int. Cl.[7] ..................................................... F16C 33/80
[52] U.S. Cl. ............................................ 384/448; 384/480
[58] Field of Search ..................................... 384/448, 446, 384/584, 589, 544, 480; 324/173, 174

[56] References Cited

U.S. PATENT DOCUMENTS 5,264,790  11/1993  Moretti et al. ........................... 384/448
5,663,640  9/1997  Sakamoto ................................ 384/448

Primary Examiner—Lenard A. Footland
Attorney, Agent, or Firm—Merchant & Gould P.C.

[57] ABSTRACT

In a goods wagon axle bearing assembly of the type provided with a sealing device (20) at its axially outer end, the sealing device comprises a rigid, non-rotating shield (21). Integrated with the sealing device (20) is a current generator, consisting of a magnetised impulse generating ring (25) rotatably fast with one of the rotating parts (12) of the bearing, and a coil (24) operatively facing the magnetised impulse ring and secured to the non-rotating shield (21). The current induced in the coil (24) is supplied to a current drain point on the same goods wagon.

7 Claims, 1 Drawing Sheet

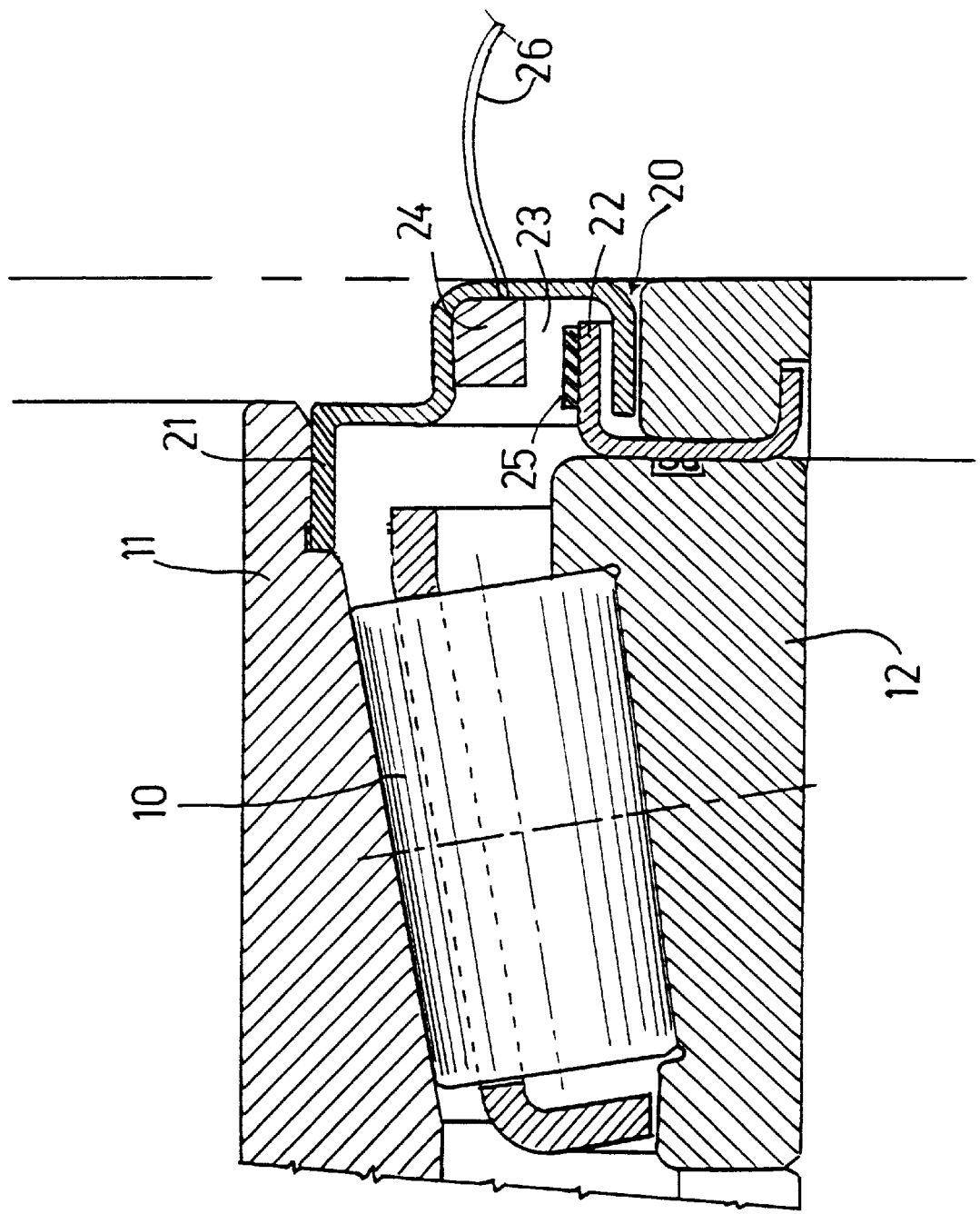

GOODS WAGON AXLE BEARING ASSEMBLY

FIELD OF THE INVENTION

The present invention refers to a bearing assembly for goods wagon axles.

BACKGROUND OF THE INVENTION

It is known that most conventional goods wagons lack an electric plant. Unlike passenger wagons, that maintain their initial arrangement for the whole of the journey or at most have some wagons added or removed, goods trains are subjected to frequent connection and splitting up operations at many stations. Therefore, where goods wagons with an electric plant are alternated to wagons lacking one, the electric power supply line along the train is interrupted.

SUMMARY OF THE INVENTION

It is an object of the present invention to provide a is system for generating and supplying electric current so as to overcome the above discussed drawback.

Another problem closely related to the lack of electric power supply in conventional goods wagons is that it is impossible to control the braking by means of anti-blocking systems (ABS). With modern high speed goods trains it is however indispensable to provide such safety systems also on goods wagons.

It is therefore another object of the present invention to generate an electric current locally in order to control the braking action of goods wagons and also activate other electric on-board fixtures.

It is known to fit railway axle bearings with rotational speed measuring devices. In these devices, a magnetised pulse generator ring is fast to a rotating part of the bearing and faces a sensor mounted to a stationary supporting element. With some solutions, rotational speed measurement devices are mounted to one of the two annular sealing shields provided at the side faces of the bearing.

A further object of the present invention is to provide a compact assembly in which the current generator is integrated in the bearing without increasing the bulk of the bearing unit, particularly in the axial direction where there are constructional limits for the admissible overall size of the bearing unit.

Toward the attainment of these and additional objects and advantages, the present invention, briefly summarised, provides a goods wagon axle bearing assembly of the type provided with a sealing device at its axially outer end, the sealing device comprising at least one rigid, non-rotating shield, characterised in that integrated with the sealing device is a current generator, consisting of a magnetic impulse generating ring rotatably fast with one of the rotating parts of the bearing, and a coil operatively facing said magnetic impulse ring and secured to said non-rotating shield.

BRIEF DESCRIPTION OF THE DRAWING

In order that the present invention may be well understood there will now be described a preferred embodiment thereof, given by way of example; reference is made to the accompanying drawing, which schematically shows a partial, axial cross sectional view of a railway axle bearing unit for goods wagons according to the present invention.

DETAILED DESCRIPTION OF THE DRAWING

With reference to the drawing, a railway axle bearing unit with tapered rollers 10 comprises an outer, non rotating race 11 and an inner, rotating race 12. The inner race 12 is generally divided into two flanked half-races, of which only the axially outer one is illustrated. At the axially outer side of the bearing races 11, 12 there is provided a labyrinth sealing device 20, known per se. The sealing device 20 comprises a pair of annular metal shields or inserts 21, 22, mounted to the outer race 11 and the inner race 12, respectively. The radially outer annular shield 21 forms a C-shaped portion 21 in axial cross section defining an annular chamber 23.

According to the present invention, the annular chamber 23 accommodates a coil, schematically designated at 24, secured to the non rotating rigid shield 21 and operatively facing a magnetised impulse ring 25 fast with the sealing shield 22. By exploiting the kinetic energy of the inner bearing race 12 that rotationally drives it, the magnetised impulse ring 25 generates a sinusoidal electric current in the coil 24. The frequency of the current is proportional to the rotational speed of the wagon wheel.

The current induced in the coil is supplied to a drain point on the same wagon through a cable 26 connected to the coil terminals. Still in accordance with the present invention, part of the current can be used as a control signal for a safety system (not shown) for preventing the wagon wheel from blocking during braking. The sinusoidal current is then rectified and used for supplying electric fixtures on board of the wagon, and/or for still other applications, for example to load buffer batteries fitted on the wagon.

By mounting a current generator at each wheel, there may be provided up to eight generators per wagon. Where required, the generated signals can be connected in parallel to obtain a current of higher amperage.

As will be apparent, a wagon fitted with the device in accordance with the present invention will be able to maintain all of its electric appliances active, regardless of whether the wagon is connected to a wagon having or lacking an electric plant.

Further, owing to the fact that the current generator is integrated in the bearing, particularly in the bearing sealing device, the overall axial dimension of the unit remains unchanged.

In addition, in order to carry out maintenance operations or in case of breakdown of the generator, it will be necessary to remove only the generator components (magnetised ring, coil) without intervening on the bearing.

While a specific embodiment of the bearing unit according to the invention has been disclosed, it is to be understood that such disclosure has been merely for the purpose of illustration and that the invention is not to be limited in any manner thereby. Various modifications will be apparent to those skilled in the art in view of the foregoing embodiment. For example, one of the sealing shields enclosing the current generator components may have one of their outwardly facing walls removable to allow inspection or removal of any of such components.

We claim:

1. A goods wagon axle bearing assembly comprising:
   a non-rotating part and a rotating part (11, 12);
   a sealing device (20) at axially outer ends of the non-rotating and rotating parts, which sealing device comprises a rigid non-rotating shield (21) fast with the non-rotating part, and a rotating shield (22) fast with the rotating part, wherein the shields comprise C-shaped portions in axial cross section, which C-shaped portions are axially opposed and overlap each other, and which C-shaped portions are further radially staggered to define an annular insulated chamber facing an inner part of the non-rotating and rotating parts; and a current generator integrated with the sealing device and placed inside the annular insulated chamber, which current generator comprises a magnetized impulse generating ring rotatably fast with the rotating shield (22) and a coil (24) operatively facing the magnetized impulse generating ring and secured to the non-rotating shield.

2. A bearing assembly as set forth in claim 1, wherein said C-shaped portions comprise first cylindrical elements axially overlapping each other, with the cylindrical element of the rotating shield being placed inside said insulated chamber and defining a support for said magnetized impulse generating ring.

3. A bearing assembly as set forth in claim 2, wherein said C-shaped portions further comprise second cylindrical elements which are located on respective opposite sides of the first cylindrical elements, said coil being positioned on the second cylindrical element of the non-rotating shield.

4. A bearing assembly as set forth in claim 3, wherein a current induced in the coil (24) is supplied (26) to a point of utilization on the same goods wagon.

5. A bearing assembly as set forth in claim 3, being fitted to each wheel of the goods wagon.

6. A bearing assembly as set forth in claim 5, wherein signals output by current generators are connected in parallel.

7. A bearing assembly as set forth in claim 3, wherein part of a current from the coil (24) is used as a control signal for a safety system to prevent a wheel of said wagon axle from blocking during braking.

* * * * *